United States Patent Office 3,396,210
Patented Aug. 6, 1968

3,396,210
COMPOSITIONS MADE FROM: (A) ISOCYANATE-TERMINATED PREPOLYMERS; AND (B) POLYESTERS PREPARED FROM POLYOLS AND $\alpha,\beta$-ETHYLENICALLY UNSATURATED MONOCARBOXYLIC ACIDS
William J. McKillip, Minneapolis, and Clarence N. Impola, Prior Lake, Minn., assignors to Ashland Oil & Refining Company, Ashland, Ky., a corporation of Kentucky
No Drawing. Filed Sept. 20, 1965, Ser. No. 488,732
11 Claims. (Cl. 260—859)

ABSTRACT OF THE DISCLOSURE

Preparation of polyurethanes from (a) isocyanate-terminated prepolymers, and (b) polyesters prepared from polyols and $\alpha,\beta$-ethylenically unsaturated monocarboxylic acids. A coating composition (e.g., a varnish) containing both a moisture curable isocyanate-terminated prepolymer and trimethylol propane trimethacrylate.

---

The present invention relates to polyisocyanate compositions, to methods of producing polyurethane resins therefrom, and to polyurethane resins derived from such compositions.

The polyisocyanate compositions of the present invention comprise mixtures of isocyanate-terminated prepolymers and liquid polyunsaturated esters of alpha,beta-ethylenically unsaturated monocarboxylic acids and polyols.

Polyurethanes obtained by the polymerization of polyisocyanate compositions form highly useful coating and laminating compositions. In preparing such coating and laminating resins, an excess of a polyisocyanate is reacted with preferably a polyhydric polyether or polyester to form an isocyanate-terminated prepolymer. This prepolymer is generally highly viscous and difficult to handle and use as a coating composition. Therefore, it is common to dissolve or disperse it in a solvent to get a less viscous coating composition. The coating composition is applied to the substrate to be coated and the contact of the coating with the moisture of the air causes further polymerization of the isocyanate-terminated prepolymer to a cured product. On evaporation of the solvent and complete reaction of the isocyanate groups a tough, solid coating is obtained. The polymerization of the isocyanate-terminated prepolymer to the final coating can be greatly accelerated by the addition of tertiary amines which act as catalysts for the further polymerization of the isocyanate groups with hydroxyl groups, by the addition of water, which results in urea linkages between two isocyanate groups, or by the addition of both water and the tertiary amines. The addition of both the water and the amine causes the curing reaction to become very rapid and much faster than the evaporation of the solvent necessary to have a flowable coating composition. Retention of the solvent by the cured coating adversely affects the properties of the coating as does evaporation of solvent subsequent to curing. Evaporation of the solvent can result in cooling the applied composition, thereby slowing up the rate of cure. Since most solvents employed are highly flammable and often toxic, it is often desirable, particularly when such coating is applied in confined spaces, to avoid the evaporation of solvents. Use of a solvent is also a disadvantage where space and/or weight limitations exist, as is usually the case in extra terrestrial applications.

In the compositions of the present invention, the solvents employed in the polyurethane laminating and coating compositions of the prior art are replaced in part or completely with liquid polyunsaturated esters of alpha, beta-ethylenically unsaturated monocarboxylic acids and polyols, which esters function as reactive solvents for the prepolymer. Thus, the above-mentioned difficulties or disadvantages with regard to solvents are lessened or overcome. The compositions of this invention have lower or workable viscosities and can be made as much as 100 percent active. In this invention, the polyunsaturated esters react with free radicals in the atmosphere to form solid polymeric materials and thus do not require removal from the polyurethane coating compositions. The polymerization of the polyunsaturated ester can be greatly enhanced and accelerated by the addition of free radical-forming compounds such as peroxides and azo compounds or by subjecting the coating to free radical generating means such as actinic radiation or high energy ionizing radiation. The addition of tertiary amines, water, and peroxides to the compositions of the present invention results in the extremely fast curing of the composition with reduced or without evaporation of the solvent for the isocyanate-terminated prepolymer. The use of isocyanate-terminated prepolymers, which are based on polyethers having hydroxyl values above 500 and m-phenylene diisocyanate, avoids the need of tertiary amines to achieve rapid curing.

The compositions of the present invention cure to homogeneous solids of exceptional clarity, heat stability, any other physical properties superior to those of the conventional prepolymer-solvent system. The heat stability of the resulting polyurethane is substantially better than that of each component when polymerized separately leading to the conclusion that the cured product is not solely a mixture of two polymers obtained by different polymerization methods, i.e., condensation and addition polymerization, but that the product may contain a block copolymer of polyurethane and the addition polymer of the ester.

The compositions of the present invention are obtained by mixing the isocyanate-terminated prepolymer with the polyunsaturated ester until a homogeneous composition is obtained. If desired, additional solvent of the type normally employed for the isocyanate-terminated prepolymer is added. In a preferred embodiment of this invention, the isocyanate-terminated prepolymer is formed in situ in the polyunsaturated ester by reaction of a polyisocyanate with an active hydrogen containing compound. The quantity of polyunsaturated ester employed in the composition can vary widely. In general, sufficient ester is employed to provide a mixture which has the desired flow for the application intended. The quantity of ester can be significantly reduced and the desired flow of the coating composition obtained by the addition of the customary diluents employed in polyurethane coating compositions such as aromatic hydrocarbons, esters, ketones, ethers, and halogenated hydrocarbons. Suitable solvents therefore include xylene, toluene, benzene, acetone, methyl ethyl ketone, dioxane, ethyl acetate, butyl acetate, butyl ethyl ether, and trichloroethylene. From the standpoint of the properties of the resulting polyurethane resins, it is generally preferred that the concentration of the polyunsaturated ester is not greater than that of the isocyanate-terminated prepolymer. Even a small concentration of the ester will have a marked effect on the properties of resulting polyurethane. The polyunsaturated ester concentration will, therefore, range from one or two percent to 100 percent by weight of the isocyanate-terminated prepolymer. The preferred concentration of the polyunsaturated ester is from 5 to 40 percent by weight of the isocyanate-terminated prepolymer.

The isocyanate-terminated prepolymers employed in the present invention are polymeric molecules containing at least two terminal isocyanate groups and having molecular weights in the range of 200 to 10,000. The isocyanate-terminated prepolymers are obtained by the reaction of a polyisocyanate with a polymeric material having two active hydrogen containing groups, as determined by the Zerewitinoff method, capable of reacting with the isocyanate group. These active hydrogen containing groups are usually OH-groups, $NH_2$-groups, NH-groups, and SH-groups. Examples of polymeric materials having active hydrogen containing groups capable of reacting with polyisocyanates are polyhydric polyesters, polyhydric polyethers, polyhydric polythioethers, polyhydric polyacetals, polyamines and mixtures thereof. The greatly preferred polymeric materials are the polyhydric polyesters and the polyhydric polyethers.

Suitable polyhydric polyesters are obtained by the condensation of polycarboxylic acids with excess polyhydric alcohols. Suitable polycarboxylic acids include oxalic acid, malonic acid, succinic acid, glutaric acid, adipic acid, pimelic acid, sebacic acid, brassylic acid, maleic acid, fumaric acid, glutaconic acid, isophthalic acid, terephthalic acid, trimellitic acid, trimesic acid, 1,4-cyclohexane dicarboxylic acid and mixtures thereof. Suitable polyhydric alcohols include ethylene glycol, 1,3-proylene glycol, 1,2-propylene glycol, 1,4-butylene glycol, 1,2-butylene glycol, 1,5-pentane diol, 1,4-pentane diol, 1,3-pentane diol, 1,6-hexane diol, 1,7-heptane diol, glycerol, trimethylol propane, 1,3,6-hexane diol, triethanolamine, 2,2,6,6-tetramethylol cyclohexanol, pentaerythritol and mixtures thereof.

Suitable polyhydric polyethers include the condensation products of alkylene oxides or of alkylene oxides with polyhydric alcohol. Alkylene oxides which can be employed include ethylene oxide, propylene oxide, butylene oxide, amylene oxide and mixtures thereof. Polyhydric polyalkylene ethers can also be prepared from such starting materials as tetrahydrofuran and epichlorohydrin. Polyhydric polyalkylene ethers can be further prepared from mixtures of polyhydric alcohols having three or more hydroxyl groups with alkylene oxides. Suitable polyhydric alcohols have been mentioned hereinabove. In general, from about 5–100 moles of alkylene oxide are condensed per mole of the trihydric or higher polyhydric alcohol.

The active hydrogen group containing material is condensed with excess polyisocyanate to result in the isocyanate-terminated prepolymer. The polyisocyanate excess is at least such that there are from 1.5 to 3 isocyanate groups for each active hydrogen containing group. Polyisocyanates condensed with the described reactive materials include ethylene diisocyanate, propylene-1,2-diisocyanate, tetramethylene diisocyanate, hexamethylene diisocyanate, cyclohexylene-1,2-diisocyanate, m-phenylene diisocyanate, 2,4-toluylene diisocyanate, 2,6-toluylene diisocyanate, 3,3-dimethyl-4,4-biphenylene diisocyanate, 4,4-biphenylene diisocyanate, 1,5-naphthalene diisocyanate, ethyl benzene-2,4-diisocyanate and mixtures thereof.

The preparation of the above described isocyanate-terminated prepolymers is well known in the art as is their use in the formation of polyurethane. Although the isocyanate prepolymers can have molecular weights from 200 to 10,000 it is generally preferred to employ prepolymers having molecular weights in the range of 500 to 3,000.

The polyunsaturated esters employed in the polyisocyanate compositions of the present invention are obtained by the reaction of a polyol with an alpha,beta-ethylenically unsaturated monocarboxylic acid. The preferred monocarboxylic acids employed to form the polyunsaturated ester are acrylic and methacrylic acid. However, other alpha,beta-ethylenically unsaturated acids having up to 12 carbon atoms can also be employed. The polyols employed to react with the acids are those above mentioned having from two to four hydroxy groups and two to eight carbon atoms. The polyunsaturated esters are obtained by transesterification of such esters as methyl methacrylate or ethyl acrylate with the polyol. The preferred unsaturated polyesters of the present invention therefore have the general formula:

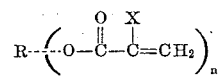

where R is an aliphatic hydrocarbon radical, X a hydrogen or a methyl group and $n$ an integer from two to four.

The order in which the polyunsaturated ester and optionally additional diluent and the isocyanate-terminated prepolymer or its precursor components are admixed is not significant. If necessary, elevated temperatures can be employed to form a homogeneous composition. It is frequently desirable in order to facilitate the formation of a homogeneous composition to admix the components in the presence of a solvent which is in part or completely removed by evaporation after a homogeneous composition has been obtained. The coating composition can be pigmented, for reinforcing, coloring or hiding purposes. They can also be prepared as clear coating and laminating compositions. Suitable pigments include metal oxides, sulfides, sulfates, silicates and chromates, metal powder or flake, carbon black, iron blues, and organic dyes and lakes thereof. Other common additives for liquid polyurethane composition can also be included such as hardeners, softeners, surface active agents and catalysts.

Particularly useful additives accelerating the curing of the isocyanate compositions of the present invention are tertiary amines, preferably trialkylamines, which result in further polymerization and cross-linking of the isocyanate-terminated prepolymer and free radical forming compounds, preferably peroxides which cause the same for the polyunsaturated ester. Examples of suitable amines are triethylamine, diethyl cyclohexyl amine, dimethyl dodecyl amine, dimethyl octadecyl amine and dimethyl stearyl amine. The preferred trialkylamines contain at least six carbon atoms and have boiling points above 90° C. so that they do not evaporate from the composition during the curing thereof. The tertiary amines are employed in catalytic concentrations such as 0.05 to 2.0 percent by weight of the total polyisocyanate composition.

Water which can be included to accelerate the curing is similarly employed in excess of the stoichiometric amount necessary to react with the available isocyanate groups in the polyisocyanate composition.

It is to be understood that the water needed to cure the polyisocyanate composition of the present invention is generally obtained from the atmosphere by absorption. It is only in situations where extremely rapid curing is desired or no moisture is in the surrounding environment that water is added to the polyisocyanate composition.

The free radical-forming compounds suitable as accelerators for the polymerization and cross-linking of the polyunsaturated esters are compounds which decompose at the temperatures of the compositions during the curing step into free radicals in sufficient concentration to initiate the polymerization of the polyunsaturated ester. Since the polymerization of the isocyanate is exothermic, any free radical-forming compound which forms significant amounts of free radicals at temperatures above room temperature can be employed. The preferred free radical-forming compounds are peroxides such as benzoyl peroxide, t-butyl hydroperoxide, diethyl peroxide, peracetic acid, acetyl peroxide and hydrogen peroxide. The concentration of the peroxide will vary with the curing rate desired and the nature of the peroxide. Generally the concentration will be in the range of 0.01 to 5 percent by weight of the polyisocyanate composition. As described hereinabove, other means of generating free radicals can be employed. Thus, the addition of compounds, such as benzoin, which under the influence of actinic radiation forms free radicals constitutes another means of initiating the polymerization of the polyunsaturated ester.

It will be apparent that the curing accelerators described hereinabove are added to the compositions of the present invention just prior to the application of such for their intended utility. Without the additives, however, the polyisocyanate compositions are stable and have good shelf lives. It should be understood that the compositions of this invention can be cured without use of such accelerators (though they are preferred), and can be cured even with heat alone.

Although the principal utility of the polyisocyanate compositions of the present invention is as coating and laminating resins, the utility is not to be understood as being limited to such. Thus the compositions can be employed in the formation of rigid or flexible foams, as molding resins, as adhesives and in other applications heretofore developed for polyurethanes.

The formation of the compositions of the present invention is further illustrated by the following examples in which all units of quantity are by weight unless otherwise stated.

Example I

Into a reaction vessel, equipped with stirrer and heating means, were charged 450 parts of a butyl acetate/dichloroethane solution of an isocyanate-terminated prepolymer made from a polyoxypropylene polyol having a hydroyl number of 530 (known commercially as "Actol 51–530") which had been reacted with excess m-phenylene diisocyanate (said solution having a solids content of 50 percent) and 90 parts of a 20 percent solution of trimethylol propane trimethacrylate in dichloroethane. The mixture was agitated and heated to evaporate all volatile solvent.

To 25 parts of the resulting viscous fluid was added in a small amount of ethyl acetate 0.02 part of dimethylaniline and 0.01 part of benzoyl peroxide. A film was drawn from the resulting mixture. On exposure to the atmosphere, the film cured within a few minutes to a hard, rigid, extremely clear composition.

Example II

Employing the procedure of Example I, 284 parts of the isocyanate-terminated polyether prepolymer solution of Example I was admixed with 86 parts of a 20 percent solution of tetraethylene glycol dimethacrylate. On heating and agitation, 125 parts of volatile solvent were evaporated.

A sample of the resulting viscous composition was cured according to the procedure of Example I with substantially the same result.

Example III

Into a three-neck reaction flask equipped with stirrer, condenser and nitrogen sweep were charger 240 parts of m-phenylene diisocyanate, 165 parts of a propylene oxide polyether of 2,2,6,6-tertamethylol cyclohexanol having an OH value of 530, 270 parts of tetraethylene glycol dimethacrylate, and 100 parts of ethyl acetate. The resulting mixture was agitated at 30 to 35° C. until the resulting solution had a solids content of 87 percent, a viscosity of 20,500 cps. at 25° C. and a free isocyanate content of 8 to 10 percent.

To a 20 part sample of the resulting composition was added 0.2 part of benzoin, which forms free radicals when exposed to actinic radiation. A film was drawn on glass and exposed to the atmosphere where the sample was in contact with moisture and subject to actinic radiation. Within a few minutes a tack free coating was obtained. After twelve hours the cured film was removed and found to have a tensile strength of 6,000 p.s.i. In the absence of the benzoin the drawn film was found to contain unreacted methacrylate and have a tensile strength of 2,000 p.s.i.

What is claimed is:

1. A polyisocyanate composition comprising a homogeneous mixture of an isocyanate-terminated prepolymer selected from the class consisting of isocyanate-terminated polyhydric polyesters and isocyanate-terminated polyhydric polyalkylene ethers, said prepolymer having a molecular weight of 500 to 3,000 and from 1 to 100 percent by weight of said prepolymer of a polyunsaturated ester having the general formula:

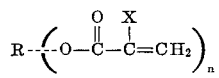

wherein R is an aliphatic hydrocarbon radical, X is a radical selected from the group consisting of hydrogen and methyl and $n$ is from two to four.

2. The polyisocyanate composition of claim 1 wherein the prepolymer is an isocyanate-terminated polyhydric polyester.

3. The polyisocyanate composition of claim 1 wherein the prepolymer is an isocyanate-terminated polyhydric polyalkylene ether.

4. The polyisocyanate composition of claim 1 wherein the polyunsaturated ester is trimethylol propane trimethacrylate.

5. The polyisocyanate composition of claim 2 wherein the polyunsaturated ester is tetraethylene glycol dimethacrylate.

6. The polyisocyanate composition of claim 3 wherein the polyhydric polyalkylene ether has a hydroxyl value of greater than 500.

7. The polyisocyanate composition of claim 3 wherein the polyhydric polyalkylene ether is a propylene oxide polyether of 2,2,6,6-tetramethylol cyclohexanol.

8. The process of preparing a polyurethane resin which comprises forming a homogeneous mixture of an isocyanate-terminated prepolymer selected from the class consisting of isocyanate-terminated polyhydric polyesters and isocyanate-terminated polyhydric polyalkylene ethers, said prepolymer having a molecular weight of 500 to 3,000 and from 1 to 100 percent by weight of the isocyanate-terminated prepolymer of a polyunsaturated ester having the general formula:

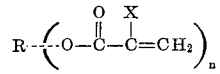

wherein R is an aliphatic hydrocarbon radical, X is a radical selected from the group consisting of hydrogen and methyl and $n$ is from two to four, and curing said mixture in the presence of polymerization catalysts for said isocyanate-terminated prepolymer and said polyunsaturated polyester.

9. The process of claim 8 wherein catalytic quantities of water and a free radical-forming compound are added to the mixture of the isocyanate-terminated prepolymer and polyunsaturated ester.

10. The process of claim 8 wherein the said polyisocyanate-terminated prepolymer is formed in the presence of said polyunsaturated ester.

11. A polyurethane comprising a homogeneous mixture of a water reacted isocyanate prepolymer selected from the class consisting of isocyanate-terminated polyhydric polyesters and isocyanate-terminated polyhydric polyalkylene ethers, said prepolymer having a molecular weight of 500 to 3,000 and from 1 to 100 percent by weight of the isocyanate prepolymer of a free radical polymerized polyunsaturated ester having the general formula:

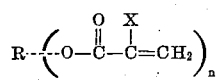

where R is an aliphatic hydrocarbon radical, X is a radical selected from the class consisting of hydrogen and methyl and $n$ is from two to four.

References Cited

UNITED STATES PATENTS 3,210,215  10/1965  Aitken et al. _____ 260—859

FOREIGN PATENTS 844,240  8/1960  Great Britain.
631,690  11/1961  Canada.

MURRAY TILLMAN, *Primary Examiner.*

P. LIEBERMAN, *Assistant Examiner.*

UNITED STATES PATENT OFFICE
CERTIFICATE OF CORRECTION

Patent No. 3,396,210                                          August 6, 1968

William J. McKillip et al.

It is certified that error appears in the above identified patent and that said Letters Patent are hereby corrected as shown below:

Column 3, line 38, after "acid" insert -- , 1,2-cyclobutane dicarboxylic acid --. Column 5, line 69, "2,2,6,6-tertamethylol" should read -- 2,2,6,6-tetramethylol --; line 67, "charger" should read -- charged --.

Signed and sealed this 10th day of March 1970.

(SEAL)
Attest:

Edward M. Fletcher, Jr.                          WILLIAM E. SCHUYLER, JR.
Attesting Officer                                         Commissioner of Patents